United States Patent
Masis et al.

(10) Patent No.: US 11,194,699 B2
(45) Date of Patent: Dec. 7, 2021

(54) COMPATIBILITY TESTING WITH DIFFERENT ENVIRONMENT CONFIGURATIONS

(71) Applicant: Red Hat, Inc., Raleigh, NC (US)

(72) Inventors: Alexander Braverman Masis, Ra'anana (IL); Jared Andre Wilkerson, Greensburg, PA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/573,669

(22) Filed: Sep. 17, 2019

(65) Prior Publication Data

US 2021/0081304 A1 Mar. 18, 2021

(51) Int. Cl.
*G06F 11/36* (2006.01)
*G06F 8/71* (2018.01)
*G06F 9/455* (2018.01)

(52) U.S. Cl.
CPC ............ *G06F 11/3676* (2013.01); *G06F 8/71* (2013.01); *G06F 9/45533* (2013.01);
(Continued)

(58) Field of Classification Search
CPC ............ G06F 11/3676; G06F 11/3684; G06F 11/3692; G06F 11/3688; G06F 8/71; G06F 9/45533; G06F 2009/45591
See application file for complete search history.

(56) References Cited

U.S. PATENT DOCUMENTS 6,931,523 B1 * 8/2005 Tomoson ............ G06F 9/44505
710/104
8,595,714 B1 * 11/2013 Hamer ..................... G06F 8/65
717/170

(Continued)

FOREIGN PATENT DOCUMENTS

CN 104572473 B 6/2017
CN 108388521 A 8/2018
(Continued)

OTHER PUBLICATIONS

Zhang et al., "Compatibility Testing Service for Mobile Applications", 2015, IEEE (Year: 2015).*

(Continued)

*Primary Examiner* — Wei Y Zhen
*Assistant Examiner* — Junchun Wu
(74) *Attorney, Agent, or Firm* — Haynes and Boone, LLP

(57) ABSTRACT

An example method of executing an application includes running a static analysis on the application and dependencies of the application. The example method also includes obtaining a template specifying one or more virtualized environments in which the application is executable. The example method further includes generating, based on the static analysis, a settings file specifying a set of system variables of a system, each system variable being an integration point between the application and a component of the system. The example method also includes generating, based on the settings file and the template, a set of environment configurations for the system. The example method further includes executing, by the system, the application in each environment configuration of the set of environment configurations.

20 Claims, 6 Drawing Sheets

(52) U.S. Cl.
 CPC ...... *G06F 11/3684* (2013.01); *G06F 11/3688* (2013.01); *G06F 11/3692* (2013.01); *G06F 2009/45591* (2013.01)

(56) References Cited

U.S. PATENT DOCUMENTS

| | | | | |
|---|---|---|---|---|
| 9,160,796 | B2* | 10/2015 | Reeves | G06F 9/452 |
| 10,067,860 | B2 | 9/2018 | Sharda et al. | |
| 2003/0074650 | A1* | 4/2003 | Akgul | G06F 11/3624 |
| | | | | 717/129 |
| 2005/0188374 | A1* | 8/2005 | Magenheimer | G06F 9/4555 |
| | | | | 718/100 |
| 2006/0037000 | A1* | 2/2006 | Speeter | H04L 67/10 |
| | | | | 717/120 |
| 2008/0181239 | A1* | 7/2008 | Wood | H04L 63/083 |
| | | | | 370/401 |
| 2008/0307415 | A1* | 12/2008 | Carter | G06F 9/44505 |
| | | | | 718/1 |
| 2009/0100412 | A1* | 4/2009 | Weiss | G06F 11/3684 |
| | | | | 717/124 |
| 2010/0138825 | A1* | 6/2010 | Harrop | G06F 9/44505 |
| | | | | 717/174 |
| 2011/0145789 | A1* | 6/2011 | Rasch | G06F 9/44505 |
| | | | | 717/121 |
| 2012/0117531 | A1 | 5/2012 | Rosenbaum et al. | |
| 2013/0031532 | A1* | 1/2013 | Guinier | G06F 11/3688 |
| | | | | 717/127 |
| 2013/0042221 | A1* | 2/2013 | Mehalingam | G06F 8/433 |
| | | | | 717/123 |
| 2013/0152047 | A1* | 6/2013 | Moorthi | G06F 11/368 |
| | | | | 717/124 |
| 2014/0137114 | A1* | 5/2014 | Bolte | G06F 9/45558 |
| | | | | 718/1 |
| 2014/0282400 | A1* | 9/2014 | Moorthi | G06F 8/71 |
| | | | | 717/122 |
| 2015/0128112 | A1* | 5/2015 | Choi | G06F 8/61 |
| | | | | 717/140 |
| 2015/0154277 | A1* | 6/2015 | Thornley | G06F 16/9535 |
| | | | | 707/737 |
| 2015/0242204 | A1* | 8/2015 | Hassine | H04L 41/5045 |
| | | | | 717/121 |
| 2016/0132420 | A1* | 5/2016 | Kuo | G06F 9/45558 |
| | | | | 717/130 |
| 2016/0335100 | A1* | 11/2016 | Pyle | G06F 9/44505 |
| 2018/0027051 | A1* | 1/2018 | Parees | G06F 8/71 |
| | | | | 709/217 |
| 2018/0113734 | A1* | 4/2018 | Yamato | H04L 67/10 |

FOREIGN PATENT DOCUMENTS

| | | |
|---|---|---|
| EP | 3182278 A1 | 6/2017 |
| GB | 2532076 A | 5/2016 |

OTHER PUBLICATIONS

Sarnowska-Upton, "Methods Toward Automatic Configuration of Computing Environments for Application Execution", May 2013, University of Virginia (Year: 2013).*

Meyer et al., "Quality Assurance for Open Source Software Configuration Management", 2014, IEEE (Year: 2014).*

Podmore et al., "Simulation Environment for Development and Testing of Plug Compatible Power System Applications", 2001, IEEE (Year: 2001).*

Kostis Kapelonis, "Software Testing Anti-patterns," Apr. 21, 2018, http://blog.codepipes.com/testing/software-testing-antipatterns.html.

* cited by examiner

COMPATIBILITY TESTING WITH DIFFERENT ENVIRONMENT CONFIGURATIONS

BACKGROUND

The present disclosure generally relates to computing devices, and more particularly to compatibility testing with different environment configurations.

An application may execute in various environments. For example, an application may execute in a container. A container provides a platform to separate an application from the infrastructure running the application. The platform may provide a mechanism to run an application securely isolated in the container. A container is a self-contained execution environment and may share the kernel of the host operating system with other containers. The lightweight nature of containers, which run without the extra load of a hypervisor, may result in better use of hardware. Additionally, multiple containers may run on a machine. In another example, an application may execute in a virtual machine. A virtual machine is a portion of software that, when executed on appropriate hardware, creates an environment allowing the virtualization of an actual physical computer system. Each virtual machine may function as a self-contained platform, running its own operating system (OS) and software applications (processes).

BRIEF SUMMARY

Methods, systems, and techniques for executing an application are provided.

An example method of executing an application includes running a static analysis on the application and dependencies of the application. The example method also includes obtaining a template specifying one or more virtualized environments in which the application is executable. The example method further includes generating, based on the static analysis, a settings file specifying a set of system variables of a system, each system variable being an integration point between the application and a component of the system. The example method also includes generating, based on the settings file and the template, a set of environment configurations for the system. The example method further includes executing, by the system, the application in each environment configuration of the set of environment configurations.

An example system for executing an application includes a settings module that runs a static analysis on the application and dependencies of the application. The settings module generates, based on the static analysis, a settings file specifying a set of system variables of a system. Each system variable is an integration point between the application and a component of the system. The example system further includes a test module that obtains a template specifying one or more virtualized environments in which the application is executable. The test module also generates, based on the settings file and the template, a set of environment configurations for the system. The test module further executes, by the system, the application in each environment configuration of the set of environment configurations.

An example machine-readable medium includes a plurality of machine-readable instructions that when executed by one or more processors is adapted to cause the one or more processors to perform a method including: running a static analysis on the application and dependencies of the application; obtaining a template specifying one or more virtualized environments in which the application is executable; generating, based on the static analysis, a settings file specifying a set of system variables of a system, each system variable being an integration point between the application and a component of the system; generating, based on the settings file and the template, a set of environment configurations for the system; and executing, by the system, the application in each environment configuration of the set of environment configurations.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
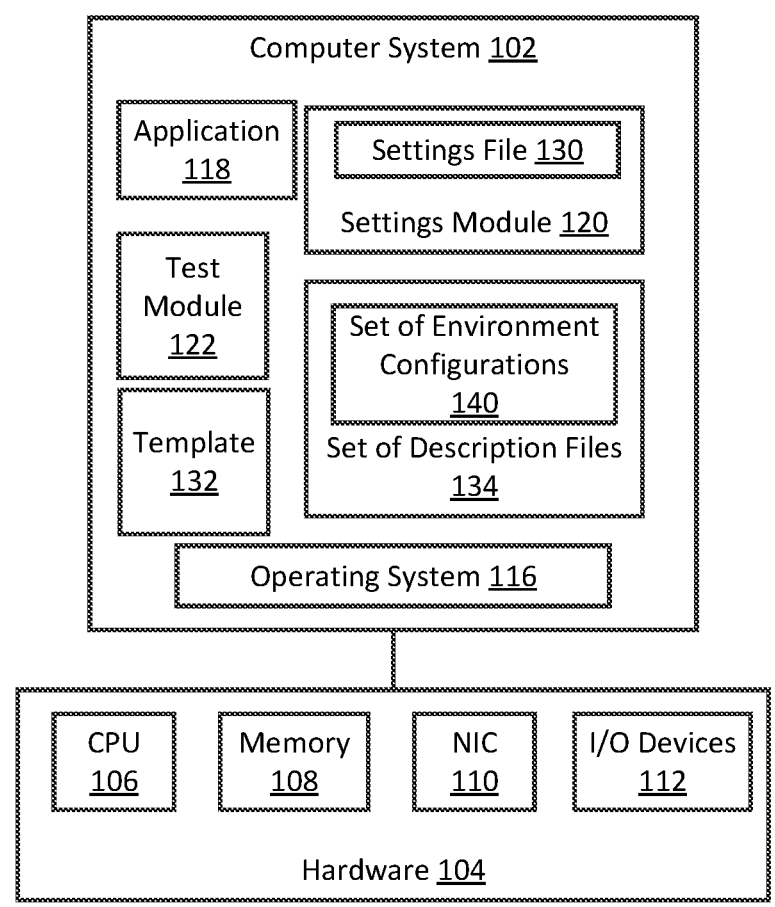
FIG. 1 is a diagram illustrating an example system for compatibility testing.

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

An application may execute in various environment configurations. In the traditional layers of program execution, the software may be considered at the top layer. Beneath the software layer may be an interface that interacts with a user or another computer program. Multiple layers may be beneath the interface, including the programming language in which the application is written, a testing framework, down to the layer including the kernel modules and drivers. Beneath these multiple layers may be the kernel itself, the specific CPU architecture, and then the hardware (e.g., the physical components such as the storage devices, network devices, etc.). Components of a layer that are beneath the software layer may be included in an environment configuration in which the application may execute.

Compatibility testing may be conducted on an application to ensure the application's compatibility with different environment configurations. Some problems with performing compatibility testing may include the lack of compatibility testing performed by developers in their local environment, the lack of compatibility coverage (in code) tracking, the difficulty in developing and maintaining compatibility tests, the difficulty in reproducing and reporting compatibility related issues, and the additional resources used for compatibility testing compared to common low-level tests.

A solution to overcoming compatibility issues may include performing fuzz testing on the application. In fuzz testing, automated or semi-automated testing techniques may be used to discover coding errors and security loopholes in software, operating systems, or networks by inputting invalid or random data called fuzz into the system. For example, in fuzz testing, inputs for software applications may provide information on how an application programming interface (API) gracefully handles various inputs, some of which may be unexpected. A result of the fuzz testing may be that the test gracefully fails, may return an error code, or may perform some type of action. The fuzz testing solution may be used for specific functions, classes, or the entire program. Currently, fuzz testing focuses on a software concept on a system. Specific cases are run to determine how they would work.

Fuzz testing focuses on specific functions in an application and less about the entire integration of an application with an environment configuration in which the application executes. For example, with fuzz testing, it may be difficult to test different environments without directly running tests in each of those specific environments. A solution to overcome the problem of directly running tests in each of those specific environments may involve using containers or virtual machines to ensure an application's compatibility with the different environments. As discussed further below, a settings file specifying a set of system variables of a system along with a template specifying one or more virtualized environments may be used for generating a set of environment configurations for the system. An advantage of using the settings file and the template may allow for testing an application in different environment configurations, without directly running tests in each of those specific environments. Accordingly, time and compute resources may be saved.

The present disclosure provides techniques for executing an application in different environment configurations. An example system for executing an application includes a settings module that runs a static analysis on the application and dependencies of the application. The settings module generates, based on the static analysis, a settings file specifying a set of system variables of a system. Each system variable is an integration point between the application and a component of the system. The example system further includes a test module that obtains a template specifying one or more virtualized environments in which the application is executable. The test module also generates, based on the settings file and the template, a set of environment configurations for the system. The test module further executes, by the system, the application in each environment configuration of the set of environment configurations.

The present disclosure provides techniques for executing an application. Unless specifically stated otherwise, as apparent from the following discussion, it is appreciated that throughout the description, discussions utilizing terms such as "determining," "storing," "running," "receiving," "sending," "obtaining," "executing," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

FIG. 1 is a diagram illustrating an example system 100 for compatibility testing. The system 100 includes a computer system 102 coupled to hardware 104. The hardware 104 includes a central processing unit (CPU) 106, a memory 108, and a network interface card (NIC) 110. The hardware 104 may include other 110 devices 112 (e.g., a graphics processing unit (GPU)). The hardware 104 includes one or more CPUs 106 for executing software (e.g., machine-readable instructions) and using or updating data stored in the memory 108. The "CPU" may also be referred to as a "central processing unit," a "processor," or "physical processor" herein. A CPU shall refer to a device capable of executing instructions encoding arithmetic, logical, or input/output (I/O) operations. In an example, the CPU 106 may follow the Von Neumann architectural model and may include an arithmetic logic unit (ALU), a control unit, and a plurality of registers. In a further aspect, a CPU may be a single-core processor that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

The memory 108 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid-state drives typically have relatively larger storage volume but relatively slower performance. Other types of memory, such as those used for RAM, are optimized for speed and may be referred to as "working memory." The various types of memory may store information in the form of software and data.

The computer system 102 may be coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

An application 118 may execute in the computer system 102. The computer system 102 includes an operating system 116 that serves as a central component for facilitating communication between software application(s) (e.g., application 118) and hardware devices 104 coupled to the computer system 102. The operating system 116 may be responsible for facilitating operating system functions and various management tasks (e.g., process management, disk management, and memory management). For example, operating system 116 manages, organizes, and keeps track of files stored on the computer system 102 that runs the operating system 116.

The computer system 102 includes a settings module 120 and a test module 122. The settings module 120 may run a static analysis on the application 118 and dependencies of the application 118. The static analysis may be performed on the source code of the application 118 and/or the binary code of the application 118. The dependencies of the application 118 may include, for example, the programming language in which the application 118 is written and the libraries on which the application 118 depends. The settings module 120 may identify how code in the application 118 uses the libraries and may identify environment-related integration points. For example, the settings module 120 may parse each line of the application 118 and determine whether the line of code is related to an environment configuration.

An environment configuration may refer to system variables that are beneath the software layer. A system variable may be, for example, environment variables, hardware information, network connectivity, file system type (e.g., New Technology File System (NFTS), File Allocation Table (FAT), Cluster File System (Cluster FS), etc.), security (e.g., access permissions), or hardware limitations (e.g., memory, storage, etc.). An environment variable may be a set of global variables that are set for an operating system that many programs rely upon. In an example, an environment variable may be the path to where executable programs are installed, the operating system running in the computer system, the version of the operating system, the set locale (e.g., language), or other bits of knowledge about the system itself. In a further example, an environment variable may be a character set (e.g., American Standard Code for Information Interchange (ASCII), Unicode Transformation Format (UTF)-8, etc.), local language (e.g., English, French, Mandarin, etc.), etc. An environment variable may be set by the system or the user. Additionally, the hardware information may include a number of processors on which the application is running, the system architecture (e.g., x86), etc. The settings module 120 and the test module 122 may create different environment configurations where, for example, system variables behave differently within the different environment configurations.

The settings module 120 may generate, based on the static analysis, a settings file 130 specifying a set of system variables of the computer system 102. The static analysis may be a detailed analysis of how the application 118 interacts with the computer system 102. Each system variable may be an integration point between the application 118 and a component of the computer system 102. An integration point may refer to a component of the computer system 102 that affects execution of the application code. The settings module 120 may identify components of the computer system 102 that will most likely affect the execution of the application 118. One or more points of integration between the application 118 and a component (e.g., CPU 106) of the computer system 102 may be predefined. A point of integration may map a command to a variable domain. For example, the application 118 may be written in the Python programming language, which has commands related to multiprocessing. In the Python programming language, a multiprocessing package supports spawning processes using an application programming interface (API) similar to a threading module and offers both local and remote concurrency. Additionally, the Python programming language may utilize multiprocessing to communicate between processes and perform synchronization between processes. In this Python programming language example, a predefined point of integration may map a command that spawns processes to a variable domain (e.g., valid input types, number of expected arguments, etc.).

The settings module 120 may generate the settings file 130 for a template 132. The template 132 may specify one or more virtualized environments in which the application 118 is executable. The template 132 may be specific to virtualization and is used along with the settings module 120 for generation of a set of environment configurations 140.

The template 132 may be a template for different virtualization technologies. The template 132 may be a template for, for example, creation of a virtual machine or a container. For example, the settings module 120 and the test module 122 may perform compatibility testing using containers and virtual machines with descriptive files such as Dockerfile™, Libvirt™ XML or Packer™.

Additionally, the system variables specified in the settings file 130 may be used as an input into the template 132 for the template 132 to generate the set of environment configurations 140 for the computer system 102. In an example, the settings file 130 may store a set of environment variables, a number of CPUs, the local language, and a type of file system being mounted and used. The test module 122 obtains the template 132 and inputs different system variables into the template (e.g., number of CPUs).

Depending on the different technologies specified in the template 132 and the settings file 130, the test module 122 may create a set of description files 134 with inputs at the different settings that a user desires to test against. The test module 122 may randomize the set of inputs from the settings file 130 and place the randomly selected set into the template. In an example, the test module 122 may generate random string inputs from the settings file 130 and feed them into the template.

The test module 122 may input one or more different system variables, change the number of CPUs on which the application 118 may run, change the file system being mounted, etc. The test module 122 may accordingly generate different environment configurations. For example, if there are five different settings for the character encoding and two different file systems, the test module 122 may generate ten tests against the multiple different environment configurations that are accessible. As discussed, the template 130 may receive inputs that are specified in the settings file 130. For example, the settings file 130 may include environment variables, local language, character sets (e.g., ASCII, UTF-8, etc.), etc. In an example, the settings file 130 specifies the ASCII and the UTF-8 character sets. In this example, the test module 122 may obtain the template 130 and generate two tests, one running against the ASCII character set and the other one running against the UTF-8 character set.

A purpose of virtualization may be to simulate hardware components and different environment configurations that otherwise would be difficult for the application to test against. The test module 122 may try different system variables specified in the settings file 130 randomly as inputs into the template 132. In an example, the test module 122 may determine what to virtualize, what to configure in the virtualization, which environment variables to configure, whether to configure the system architecture, whether to configure the file system, and/or whether to configure the operating system or a version of the operating system. The test module 122 may randomize the inputs into the template 132 based upon the settings file 130. For example, the test module 122 may determine whether the application 118 is CPU dependent, environment variable dependent, file system dependent, etc., and may randomize those inputs based on the static analysis.

The test module 122 may generate, based on the settings file 130 and the template 132, the set of environment configurations 140 for the computer system 102. The test module 122 may generate a set of description files 134 storing the set of environment configurations 140. A single description file may correspond to a single environment configuration of the set of environment configurations. The test module 122 may include a testing framework that receives the settings file 130 and the template 130 as inputs. The testing framework may combine the settings file 130 with an existing template (e.g., the template 132) and run the various settings against the template to create the set of description files 134. The test module 122 may generate the set of description files 134 for the different virtualization technologies in accordance with, for example, changes to the environment variables, hardware information, hardware descriptions, and/or different operating systems that are running in the computer system 102.

The test module 122 may execute the application 118 in each environment configuration of the set of environment configurations specified in the set of description files 134. In an example, the application 118 may use multiprocessing and attempts to utilize a library that supports multiprocessing. The library may provide the application 118 with information on the number of CPUs in the computer system 102. Traditionally, testing of the actual documentation with traditional tools may be difficult because the developer would set up a system having the environment configuration and manually test the application 118 in each of the environment configurations. The present application provides techniques for running the application 118 within multiple environment configurations. For example, the test module 122 may create an environment configuration with zero CPUs in the computer system 102, and execution of the application 118 in such an environment configuration may accordingly fail. The test module 122 may also create an environment configuration with one CPU in the computer system 102, and execution of the application 118 in such an environment configuration may accordingly fail. The test module 122 may also create an environment configuration with five CPUs in the computer system 102, and execution of the application 118 in such an environment configuration may accordingly succeed. The test module 122 may also create an environment configuration with twenty CPUs in the computer system 102, and execution of the application 118 in such an environment configuration may accordingly succeed. If the computer system 102 is restricted to executing a maximum number of CPUs (e.g., eight CPUs), then the application 118 would executed in accordance with the maximum number of CPUs. In another example, the test module 122 may create an environment configuration with a first part of the operating system that affects execution of the application 118 (e.g., first operating system state) and an environment configuration with a second part of the operating system that affects execution of the application 118 (e.g., second operating system state), where the different operating system states may simulate the virtual environment to be tested.

The test module 122 may generate the different environment configurations for testing the application 118 against to determine whether the application 118 may execute in such an environment configuration and may additionally identify those environment configurations that cause execution of the application 118 to fail. The test module 122 may execute the application 118 in the one or more generated environment configurations and determine whether the application 118 successfully executed in each of the generated environment configurations. If a test has failed, the test module 122 may flag the environment configuration in which the test ran. In an example, if the application 118 is expecting eight CPUs and the test module 122 detects that the application 118 is running on four CPUs, the test module 122 may throw an error. The test module 122 may catch the error and return a failed test. In this example, a developer may address the issue. The developer may identify each application run that has been flagged as a failure, and generate a fixed test that specifies the environment configuration in which the application execution failed as a repeat test. In this way, system bugs may be eliminated along with the failure to execute. In some examples, the test module 122 uses the settings file 130 and the template 132 with the specific framework of virtualization (e.g., Dockerfile®, Libvirt XML or Packer), and runs those systems and creates the environment configuration for testing execution of the application 118.

Rather than run the application 118 in a large number of different environment configurations, which may be difficult and time consuming from a resource perspective, the types of system variables that can affect execution of the program and what can run in the environment configuration may be predefined. The test module 122 may optimize the template 132 before the template 132 is generated. The test module 122 may optimize the template input size (e.g., number of variables) to the tested target by static analysis that identifies environment-related integration points, such as environment variables, hardware information, network connectivity, file system, security, and/or hardware limitations. The test module 122 may test the application 118 in the environment configurations, with an automated input optimization to find the best examples and save them in a common database. The tested target may be the entire system (e.g., application 118), sub-systems (modules), functions, and/or single statements of code.

In an example, the test module 122 may optimize the template 132 if the application 118 will not execute in a given environment configuration. A point of integration may predefine what is correct for a given environment configuration. For example, if the application 118 includes multiprocessing and the application 118 executes on the LINUX™ operating system, which does not support multiprocessing, the number of CPUs on which the application 118 executes will be one, regardless of the number of CPUs specified for the environment configuration. If the application 118 does not call for multiprocessing, the test module 122 may not try to optimize the template 132 in terms of the number of CPUs utilized for executing the application 118. In this example, the test module 122 may not try to run different numbers of CPUs because this has been defined as not affecting the program. In another example, the application 118 may call for multiprocessing, but may have been defined with at most two processors running in parallel. In this example, it may be difficult to detect by static analysis and a human may manually intervene and provide an input indicating that a maximum number of CPUs for the environment configurations is two. In this example, an environment configuration may specify one or two processors.

If the application 118 executes successfully in a given environment configuration, then the test of the environment configuration has passed. If the application 118 does not execute successfully in a given environment configuration, then the test of the environment configuration has failed. If a test fails, the test module 122 may save the failed environment configuration into a database. As discussed, a developer may inspect the database and may identify the issues that led to a failure.

Figure 2:
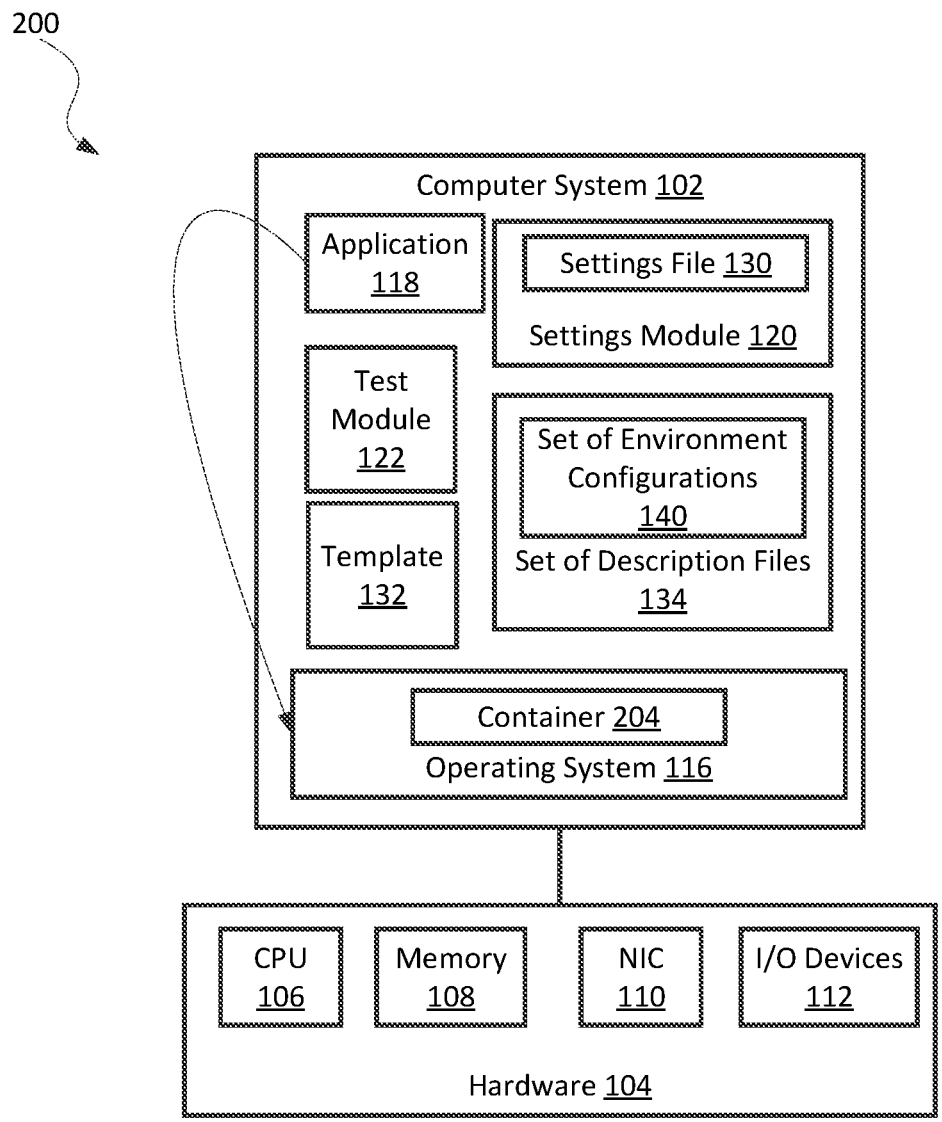
FIG. 2 is a diagram illustrating an example system for compatibility testing using a container.

FIG. 2 is a diagram illustrating an example system 200 for compatibility testing using a container. In FIG. 2, the test module 122 may obtain the template 132 specifying a container 204 and load the container 204 into the operating system 116. In another example, the operating system 116 may load the container 204 itself. The container 204 shares the same kernel of the host machine (e.g., computer system 102). The container 204 may run one or more applications 118 on the local host (e.g., computer system 102), on physical or virtual machines in a data center, or in the cloud. The container 204 may include an entire runtime environment: the application 118, plus all its dependencies, libraries and other binaries, and configuration files needed to run it, bundled into one package. Although computer system 102 is illustrated as including one container, it should be understood that computer system 102 may include more than one container.

In an example, the settings module 120 and the test module 122 may perform compatibility testing using the container 204. The container 204 may provide a platform to separate the application 118 from the infrastructure running the application 118. The platform may provide a mechanism to run the application 118 securely isolated in the container 204. A container is an isolated processing space that can exist on top of a virtual machine or on top of actual hardware. Additionally, a container is a self-contained execution environment and may share the kernel of the host operating system with other containers. The lightweight nature of containers, which run without the extra load of a hypervisor, may result in better use of hardware and preservation of resources. Additionally, multiple containers may run on a machine. In an example, a container may offer software that creates virtual environments mimicking a full virtual machine.

The settings module 120 may run a static analysis on the application 118 and dependencies of the application 118. Additionally, the settings module 120 may generate the settings file 130 specifying a set of system variables of the computer system 102. The test module 122 may obtain the template 132 specifying one or more virtualized environments (e.g., containers) in which the application 118 is executable. Additionally, the test module 122 may generate, based on the settings file 130 and the template 132, the set of environment configurations 140 for the system. The test module 122 may launch a container to simulate each of the environment configurations of the set of environment configurations 140 for testing the application 118. The test module 122 may store the set of environment configurations 140 into the set of description files 134. The test module 122 may execute the application 118 in each environment configuration of the set of environment configurations 140.

Figure 3:
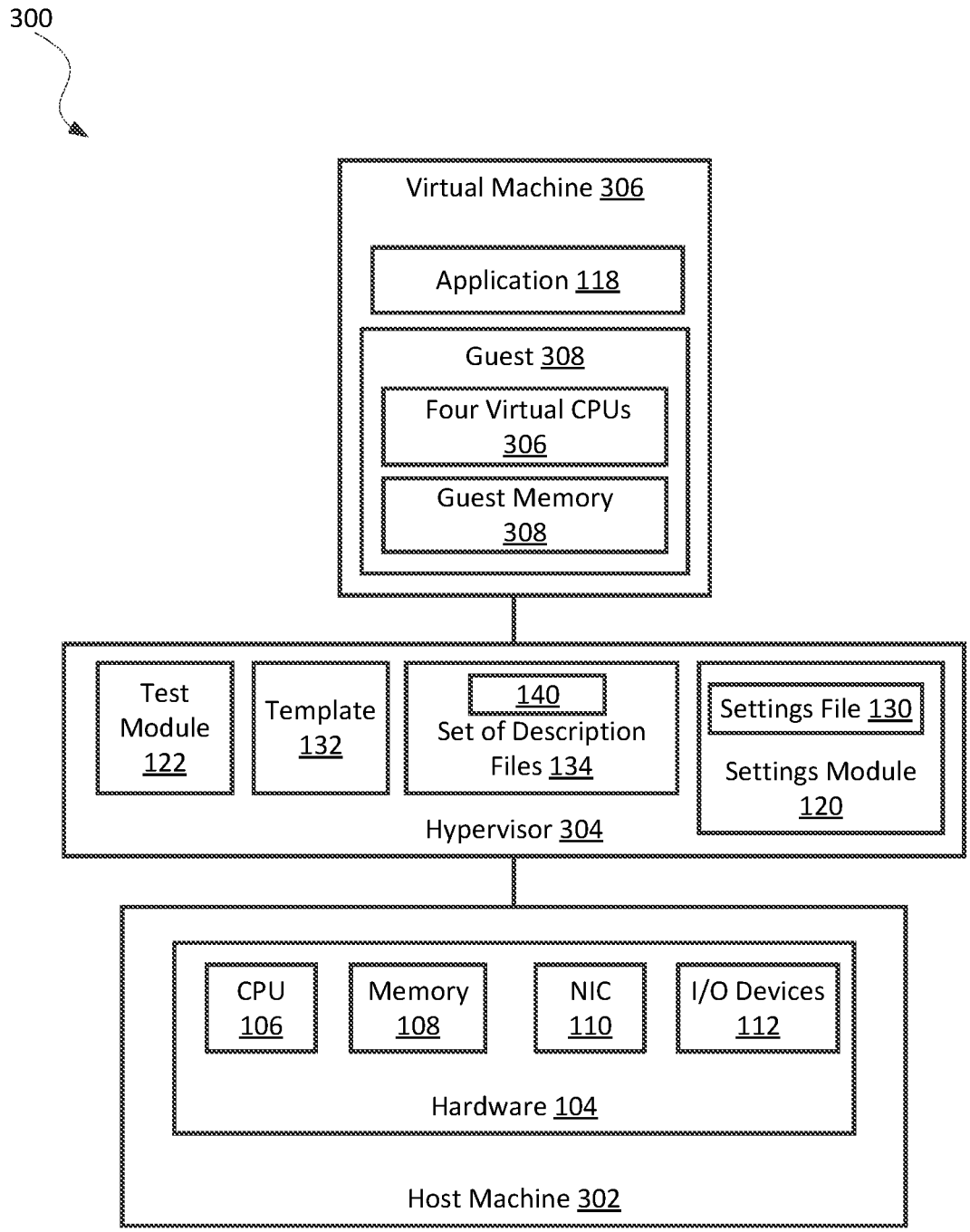
FIG. 3 is a diagram illustrating an example system for compatibility testing using a virtual machine.

FIG. 3 is a diagram illustrating an example system 300 for compatibility testing using a virtual machine. In FIG. 3, a host machine 302 includes a hypervisor 304 and a virtual machine 306. The virtual machine 306 includes a guest operating system 308 that may also be referred to as a guest. A host machine may run one or more virtual machines that run applications and services. The hypervisor may provide the virtual machine with access to resources on the host machine. The virtual machine runs a guest OS that may be different from another guest OS system running in another virtual machine that is running on the host machine and may also be different from the host OS running on the host machine. The host or guest OS may include, for example, MICROSOFT® WINDOWS®, LINUX®, SOLARIS®, and MAC® OS. Trademarks are the property of their respective owners.

The host machine 302 may be enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

The test module 122 may obtain the template 132 specifying the virtual machine 306 and launch the virtual machine 306. In an example, the settings module 120 and the test module 122 may perform compatibility testing using the virtual machine 306. The settings module 120 may run a static analysis on the application 118 and dependencies of the application 118. Additionally, the settings module 120 may generate the settings file 130 specifying a set of system variables of the computer system 102. The test module 122 may launch a virtual machine to simulate each of the environment configurations of the set of environment configurations 140 for testing the application 118. For example, the virtual machine 306 may have four CPUs, and the application 118 may execute in the virtual machine 306. The test module 122 may also launch another virtual machine (not shown) with eight CPUs, and the application 118 may execute in this virtual machine. The test module 122 may obtain the template 132 specifying the one or more virtualized environments (e.g., virtual machines) in which the application 118 is executable. Additionally, the test module 122 may generate, based on the settings file 130 and the template 132, the set of environment configurations 140 for the system. The test module 122 may store the set of environment configurations 140 into the set of description files 134. The test module 122 may execute the application 118 in each environment configuration of the set of environment configurations 140.

Figure 4:
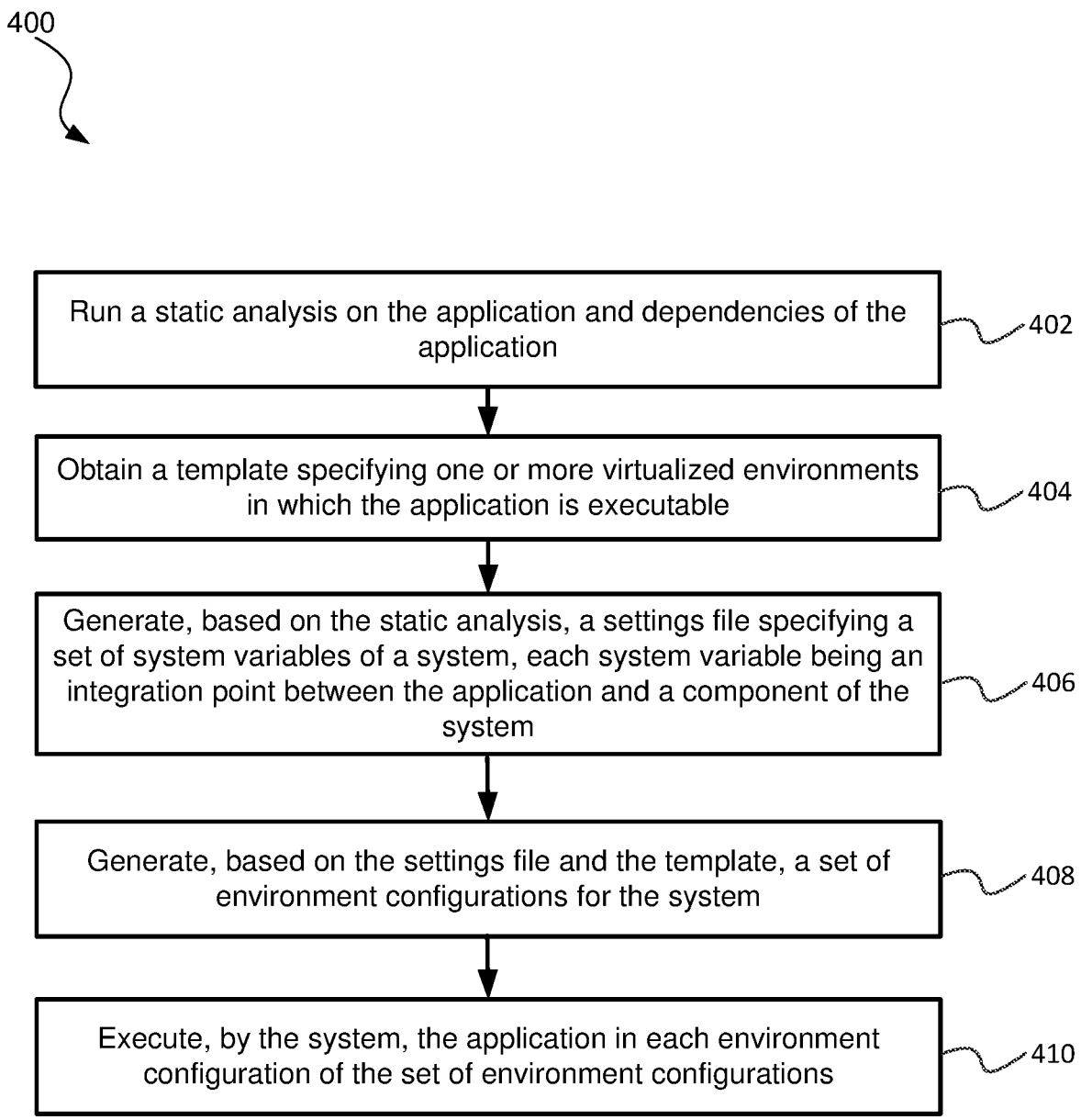
FIG. 4 is a flowchart illustrating an example method of compatibility testing.

FIG. 4 is a flowchart illustrating an example method 400 of compatibility testing. Blocks of the method 400 can be executed by a computing device (e.g., a processor, processing circuit, and/or other suitable component) or other suitable means for executing or performing the blocks. For example, a settings module, a test module, an operating system, and/or a virtualized environment may utilize one or more components, such as the CPU 106, the memory 108, the NIC 110, or other I/O devices 112 to execute the blocks of method 400. As illustrated, the method 400 includes a number of enumerated blocks, but examples of the method 400 may include additional blocks before, after, and in between the enumerated blocks. In some examples, one or more of the enumerated blocks may be omitted or performed in a different order.

At block 402, the method 400 includes running a static analysis on the application and dependencies of the application. At block 404, the method 400 includes obtaining a template specifying one or more virtualized environments in which the application is executable. At block 406, the method 400 includes generating, based on the static analysis, a settings file specifying a set of system variables of a system, each system variable being an integration point between the application and a component of the system. At block 408, the method 400 includes generating, based on the settings file and the template, a set of environment configurations for the system. At block 410, the method 400 includes executing, by the system, the application in each environment configuration of the set of environment configurations.

It is understood that additional blocks may be performed before, during, or after blocks 402-410 discussed above.

Figure 5:
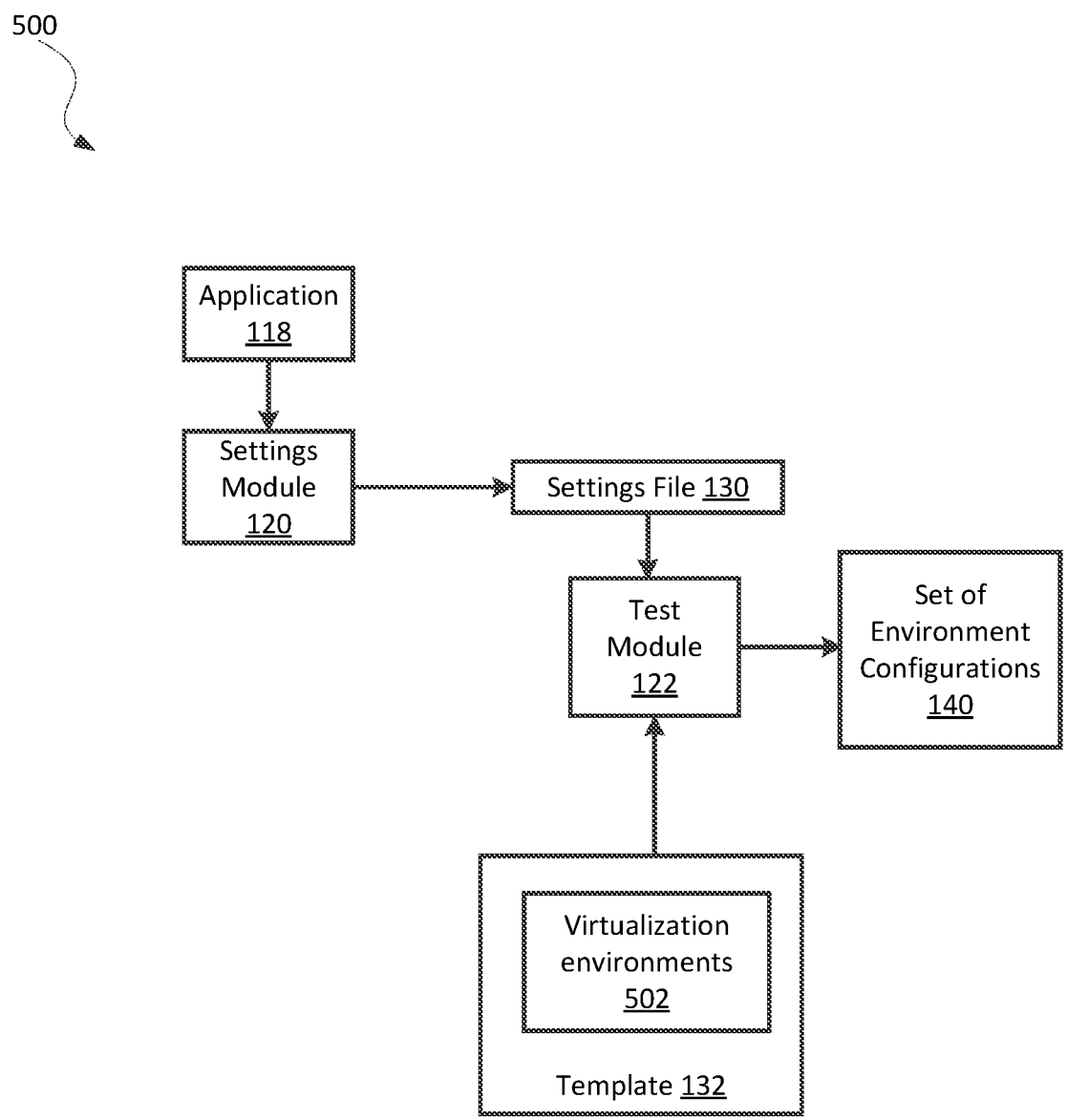
FIG. 5 is a block diagram illustrating an example system for compatibility testing.

FIG. 5 is a block diagram illustrating an example system 500 for compatibility testing. In FIG. 5, the settings module 120 runs a static analysis on the application 118 and dependencies of the application 118. The settings module 120 generates, based on the static analysis, the settings file 130 specifying a set of system variables of a system. Each system variable may be an integration point between the application 118 and a component of the system. Additionally, the test module 122 obtains the template 132 specifying one or more virtualized environments 502 in which the application 118 is executable. A virtualized environment 502 may include a container and/or a virtual machine. The test module 122 generates, based on the settings file 130 and the template 132, a set of environment configurations 140 for the system. The test module 122 may store the set of environment configurations 140 into the set of description files 134 (see FIG. 1). The test module 122 may execute the application 118 in each environment configuration of the set of environment configurations.

As discussed above and further emphasized here, FIGS. 1-5 are merely examples, which should not unduly limit the scope of the claims.

Figure 6:
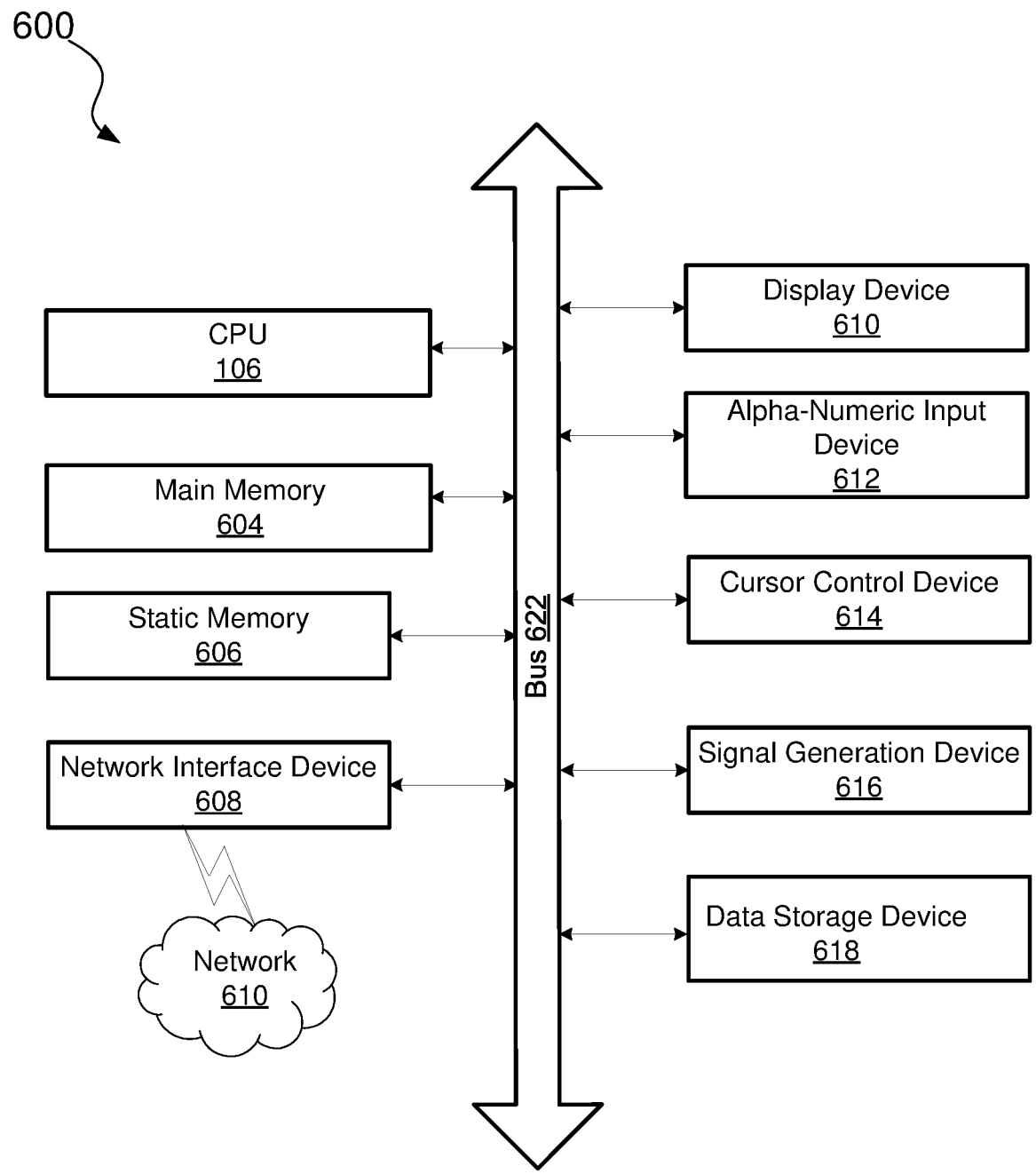
FIG. 6 is a block diagram of a computer system suitable for implementing one or more examples of the present disclosure.

FIG. 6 illustrates a system diagram of a machine 600 within which a set of instructions, for causing the machine to perform any one or more of the methodologies discussed herein, may be executed in the example form of a computer system coupled to the hardware 104. The machine 600 may be connected (e.g., networked) to other machines in a local area network (LAN), an Intranet, an extranet, or the Internet. The machine 600 may operate in the capacity of a server or a client machine in a client-server network environment, or as a peer machine in a peer-to-peer (or distributed) network environment. The machine 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. The machine 600 may correspond to the computer system 102, the host machine 302, etc.

In the present example, the machine 600 includes the CPU 106, main memory 604, static memory 606, and a data storage device 618, which communicate with each other via a bus 622. The CPU 106 represents one or more general-purpose processing devices such as a microprocessor, or the like. More particularly, the CPU 106 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The CPU 106 may also be one or more special-purpose processing devices such as an application specific integrated circuit (ASIC), a field programmable gate array (FPGA), a digital signal processor (DSP), a network processor, or the like. The CPU 106 is configured to execute instructions for performing the operations, actions, and steps discussed herein (e.g., the method 400 discussed in relation to FIG. 4, etc.).

The memory may be one or more of many different types of memory. The various types of memory may store information in the form of software and data. The software may include the operating system 116, the application 118, and various other software applications. Main memory 604 may be, for example, ROM, flash memory, dynamic random-access memory (DRAM) such as synchronous DRAM (SDRAM), double data rate (DDR SDRAM), or DRAM (RDRAM), and so forth. Static memory 606 may be, for example, flash memory, static random-access memory (SRAM), and so forth.

The machine 600 may further include a network interface device 608, an alphanumeric input device 612 (e.g., a keyboard) that accepts input from a user, a cursor control device 614 (e.g., a mouse) that accepts input from a user, a signal generation device 616 (e.g., a speaker), and a display device 610. In an example, a client device may provide via the input device 612 user input that causes the settings module 120 to perform static analysis on the application 118 and to generate the settings file. In another example, the client device may provide via the input device 612 user input that causes the test module 122 to obtain the template, generate the set of environment configurations, and/or execute the application in each environment configuration of the set of environment configurations. The network interface device 608 may correspond to the NIC 110 in FIG. 1.

The display device 610 may be a physical display device that displays data processed by the machine 600. The physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display, or another type of display unit. The display may be physically attached to the machine 600 or separate from and physically coupled via a wired or wireless connection to the machine 600. In an example, the display device 610 is part of, and integrated into, the machine 600 (e.g., a screen of the computing system and/or the client device). The display device 610 may be sold with and attached to the computing system and/or the client device such that when a user views content via the computing system and/or the client device, the content is displayed on the display device 610. It will be appreciated that other physical display devices are contemplated, and that the various types named herein are not limiting.

The data storage device 618 may include a computer-readable storage medium that stores one or more sets of instructions (e.g., software) embodying any one or more of the methodologies or functions described herein. The instructions may also reside, completely or at least partially, within main memory 604 and/or within the CPU 106 during execution thereof by the machine 600. Additionally, the main memory 604 and the CPU 106 may also constitute computer-readable storage media. The instructions may further be transmitted or received over the network via the network interface device 608. While the data storage device 618 is shown in an example to be a single medium, the term "data storage device" should be taken to include a single medium or multiple media (e.g., a centralized or distributed database, and/or associated caches and servers) that store the one or more sets of instructions. The term "computer-readable storage medium" may also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. The steps or actions are those causing physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative examples have been shown and described, a wide range of modification, change, and substitution is contemplated in the foregoing disclosure and in some instances, some features of the disclosure may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the disclosure disclosed herein.

We claim:

1. A method of executing an application, comprising:
   running a static analysis on the application and dependencies of the application;
   obtaining a template specifying one or more virtualized environments in which the application is executable;
   generating, based on the static analysis, a settings file specifying a set of system variables of a system, each system variable being an integration point between the application and a component of the system, each integration point mapping a command to a variable domain;
   generating, based on the settings file and the template, a set of environment configurations for the system; and
   for each environment configuration of the set of environment configurations:
      executing, by the system, the application in the respective environment configuration;
      determining whether the application was successfully executed in the respective environment configuration; and
      sending an error message in response to a determination that the application was not successfully executed in the respective environment configuration.

2. The method of claim 1, wherein the template specifies a container.

3. The method of claim 1, wherein the template specifies a virtual machine.

4. The method of claim 1, wherein the set of system variables includes at least one of an environment variable.

5. The method of claim 4, wherein the environment variable is a global variable that is set for an operating system.

6. The method of claim 4, wherein the environment variable is set by the system.

7. The method of claim 4, wherein the environment variable is set by a user.

8. The method of claim 1, wherein the set of system variables includes at least one of a file system type or a hardware limitation.

9. The method claim 1, wherein the set of system variables includes at least one of hardware information or network connectivity.

10. The method of claim 1, wherein generating the set of environment configurations includes generating a first environment configuration and a second environment configuration, the first environment configuration being based on placing a first set of inputs from the settings file into the template, and the second environment configuration being based on placing a second set of inputs from the settings file into the template.

11. The method of claim 10, wherein the first environment configuration is different from the second environment configuration.

12. The method of claim 1, comprising:
   storing into a database an indication that the application did not successfully execute in the first environment configuration in response to the determination that the application was not successfully executed in the first environment configuration.

13. The method of claim 12, comprising:
   flagging the first environment configuration as unsuccessful via an entry in the database.

14. A system for executing an application, comprising:
   a non-transitory memory; and
   one or more processors coupled to the non-transitory memory and configured to read instructions from the non-transitory memory to cause the system to perform operations comprising:
      running a static analysis on the application and dependencies of the application;
      generating, based on the static analysis, a settings file specifying a set of system variables of the system, wherein each system variable is an integration point between the application and a component of the system, wherein each integration point maps a command to a variable domain;
      obtaining a template specifying one or more virtualized environments in which the application is executable;
      generating, based on the settings file and the template, a set of environment configurations for the system; and
      for each environment configuration of the set of environment configurations:
         executing, by the system, the application in the respective environment configuration;
         determining whether the application was successfully executed in the respective environment configuration; and sending an error message in response to a determination that the application was not successfully executed in the respective environment configuration.

15. The system of claim 14, wherein the template specifies a container.

16. The system of claim 14, wherein the template specifies a virtual machine.

17. The system of claim 14, wherein the set of system variables includes at least one of an environment variable, a file system type, a hardware limitation, hardware information, or network connectivity.

18. The system of claim 14, wherein the operations further comprise:
    generating a first environment configuration and a second environment configuration, wherein the first environment configuration is based on placing a first set of inputs from the settings file into the template, and the second environment configuration is based on placing a second set of inputs from the settings file into the template, and wherein the first environment configuration is different from the second environment configuration.

19. The system of claim 14, wherein the operations further comprise:
    storing into a database an indication that the application did not successfully execute in the first environment configuration in response to a determination that the application was not successfully executed in the first environment configuration; and
    flagging the first environment configuration as unsuccessful via an entry in the database.

20. A non-transitory machine-readable medium comprising a plurality of machine-readable instructions that when executed by one or more processors is adapted to cause the one or more processors to perform a method comprising:
    running a static analysis on an application and dependencies of the application;
    obtaining a template specifying one or more virtualized environments in which the application is executable;
    generating, based on the static analysis, a settings file specifying a set of system variables of a system, each system variable being an integration point between the application and a component of the system, each integration point mapping a command to a variable domain;
    generating, based on the settings file and the template, a set of environment configurations for the system; and
    for each environment configuration of the set of environment configurations:
        executing, by the system, the application in the respective environment configuration;
        determining whether the application was successfully executed in the respective environment configuration; and
        sending an error message in response to a determination that the application was not successfully executed in the respective environment configuration.

* * * * *